INVENTOR
Robert E. Liddell

Oct. 27, 1964    R. E. LIDDELL    3,154,485
APPARATUS FOR FILTERING LIQUIDS
Filed Nov. 2, 1960    15 Sheets-Sheet 4

INVENTOR
Robert E. Liddell
BY
Watson, Cole, Grindle & Watson
ATTORNEYS

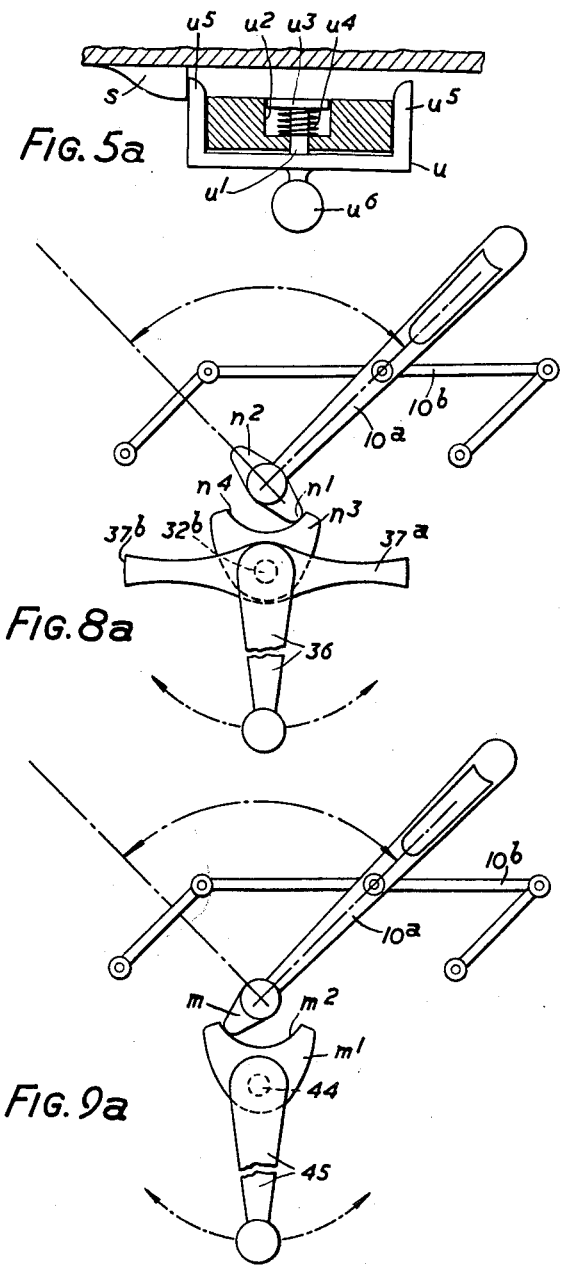

Oct. 27, 1964  R. E. LIDDELL  3,154,485
APPARATUS FOR FILTERING LIQUIDS
Filed Nov. 2, 1960  15 Sheets-Sheet 6

INVENTOR
Robert E. Liddell
BY
Watson, Cole, Grindle & Watson
ATTORNEYS

INVENTOR
Robert E. Liddell
BY
Watson, Cole, Grindle & Watson
ATTORNEYS

INVENTOR
Robert E. Liddell
BY
Watson, Cole, Grindle & Watson
ATTORNEYS

Oct. 27, 1964 R. E. LIDDELL 3,154,485
APPARATUS FOR FILTERING LIQUIDS
Filed Nov. 2, 1960 15 Sheets-Sheet 13

INVENTOR
Robert E. Liddell
BY
Watson, Cole, Grindle & Watson
ATTORNEYS

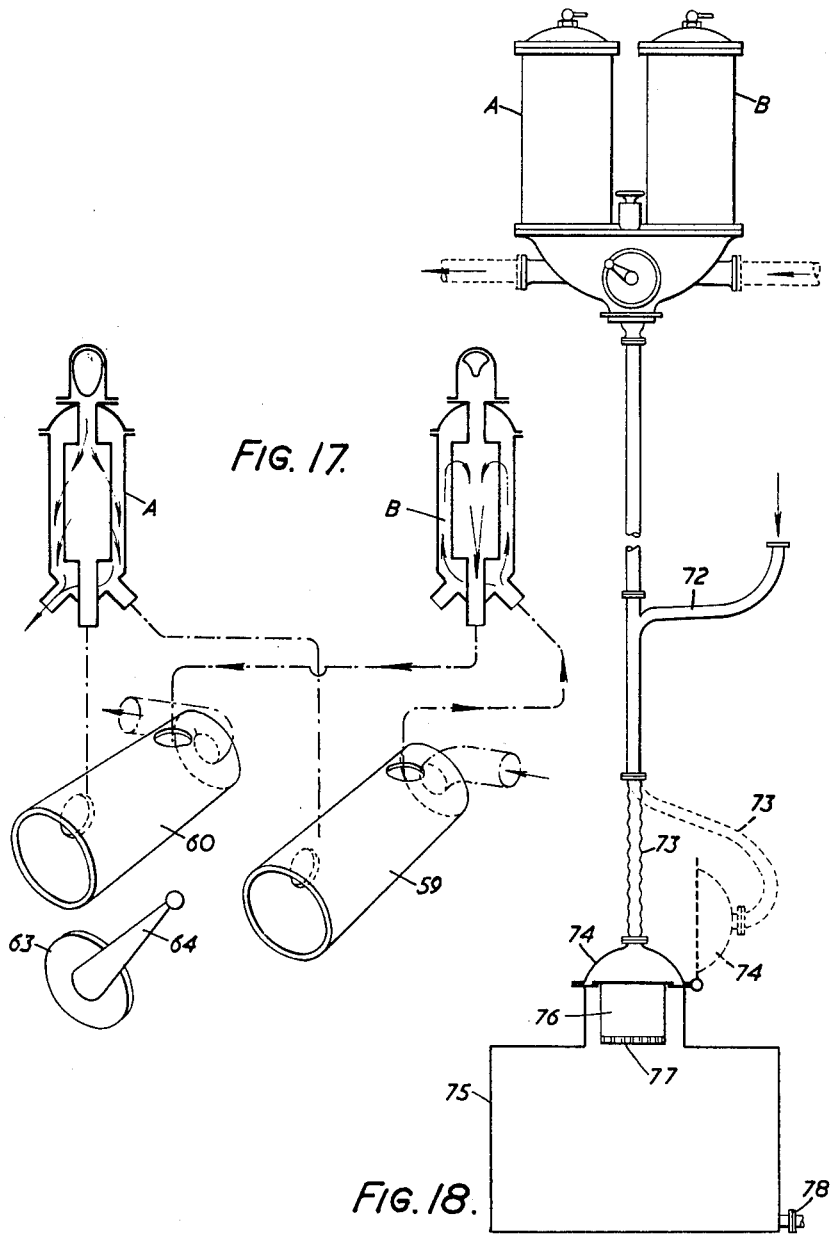

United States Patent Office 3,154,485
Patented Oct. 27, 1964

3,154,485
APPARATUS FOR FILTERING LIQUIDS
Robert Emond Liddell, Coatbridge, Scotland, assignor to Yarrow and Company Limited, Glasgow, Scotland
Filed Nov. 2, 1960, Ser. No. 66,759
Claims priority, application Great Britain, Nov. 4, 1959, 37,474/59
8 Claims. (Cl. 210—128)

This invention relates to duplex filter plants comprising a pair of filter units so arranged that the flow of liquid to be filtered can be changed over from one unit to the other so that when one unit is brought into service, the other is automatically withdrawn from service.

It is an object of the invention to provide means whereby the particular unit not in service at any time can be cleaned by a reflux flow of filtered liquid to remove foreign matter which may be clogging the filter element.

According to the present invention a duplex filter plant comprises a pair of filter units, changeover valve means for controlling the flow of liquid through the filter units, means for operating said valve means into two predetermined positions such that in one of said positions one of the units is connected in service to filter liquid and the other unit is out of service and in the other predetermined position the said other unit is brought into service to filter liquid and the first mentioned unit brought out of service, manually operable means for initiating a reflux flow of filtered liquid through either of said units to clean the filter element thereof and means operable to limit the operation of said manually operable means so that it can be operated to effect a reflux flow only through the unit not in service and when the change over valve means is in one of the said predetermined positions.

The reflux flow may be controlled by the continued movement of a lever, which controls the change over of the units, such that when a change-over has been effected, continued movement of the lever will operate valve means to permit the reflux flow to the unit not then in service.

The continued movement of the lever may be adapted to reposition the valve controlling the flow to the unit not in service to permit a flow of liquid from the discharge side of the unit in service through the unit not in service. Alternatively, the said continued movement of the lever may open a separate reflux valve.

Alternatively the valve means controlling the reflux flow may be operable by a lever or the like separate from the change over lever, and manually releasable detent means provided for limiting the operation of the change over lever to the movement necessary to effect the change over of the units, continued movement to effect reflux claning being permitted only after the detent means has been manually released.

To enable the invention to be fully understood it will now be described with reference to the accompanying drawings in which:

FIGURE 5a illustrates in diagrammatic form one embodiment of a releasable detent for limiting the rotation of the lever 10;

FIGURE 8a illustrates in diagrammatic form one embodiment of an interlocking arrangement for the levers 10a and 36 of FIGURE 8;

FIGURE 9a illustrates in diagrammatic form one embodiment of an interlocking arrangement for the levers 10a and 45 of FIGURE 9;

FIGURE 16 is a schematic view illustrating the position of the valves and flow of liquid when unit A is in service and unit B is being refluxed cleaned and FIGURE 17 is a schematic view illustrating the position of the valves and flow of liquid when unit B is in service and unit A is being reflux cleaned;

FIGURE 18 shows in diagrammatic form one of a series of duplex filter plants connected with a tank for receiving reflux liquid.

Figure 1:
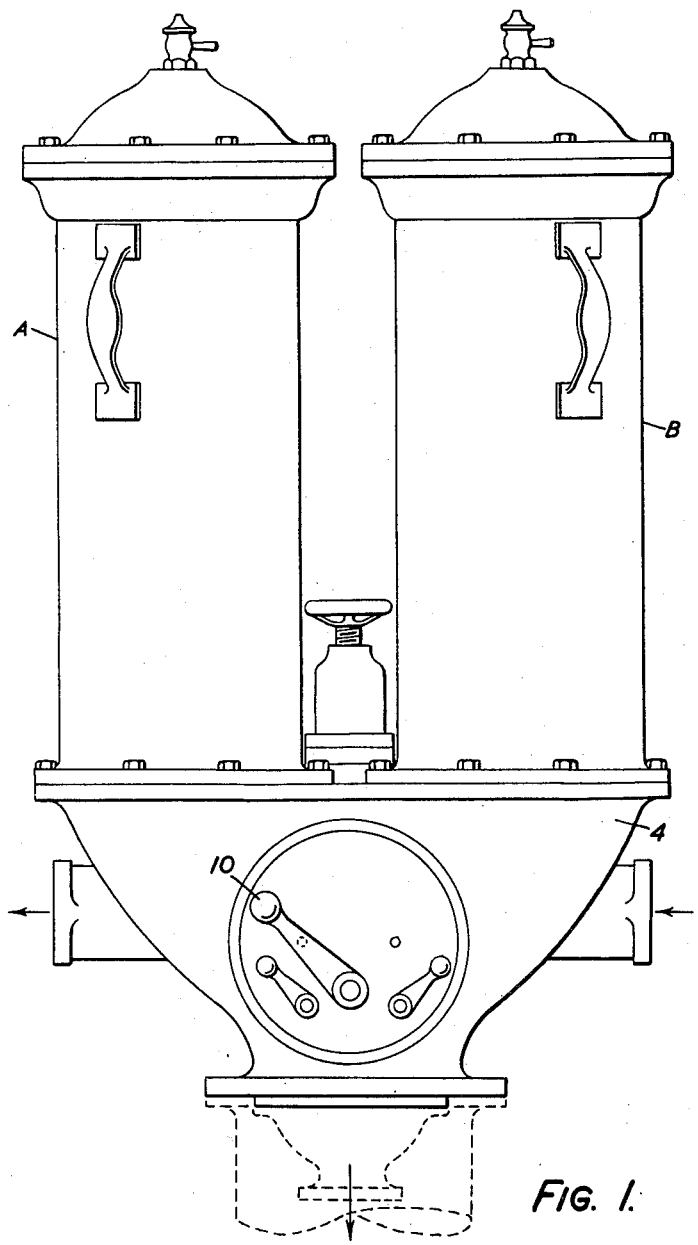
FIGURE 1 is a view in elevation of a duplex filter plant.

As shown in the accompanying drawings a duplex filter plant comprises a pair of filter units A, B, each including a casing 1 housing a cylindrical filter element 2 in which is disposed a hollow member 3 of paraboloidal, pyramidal or like shape having an open upper end and whose lower end abuts the inner lower end of the element 2. During the reflux cleaning operation the member 3 acts as a deflector in the manner to be described later. The member 3 also serves another useful purpose which will be explained hereinafter.

The casing 1 and elements 2 are detachably mounted on a common base 4 provided with valve means and conduits for controlling the flow of liquid to the respective filter units A, B.

The filter units are preferably provided with removable caps 1a to enable the filter elements to be inspected and removed when necessary. Further the casings 1 may be detachably secured at their lower end to the members 4, to enable them to be removed sideways, assuming there is insufficient head room, for the filter element to be removed and replaced in a vertical direction. It will be understood that the filter would be first drained of liquid.

Figure 3:
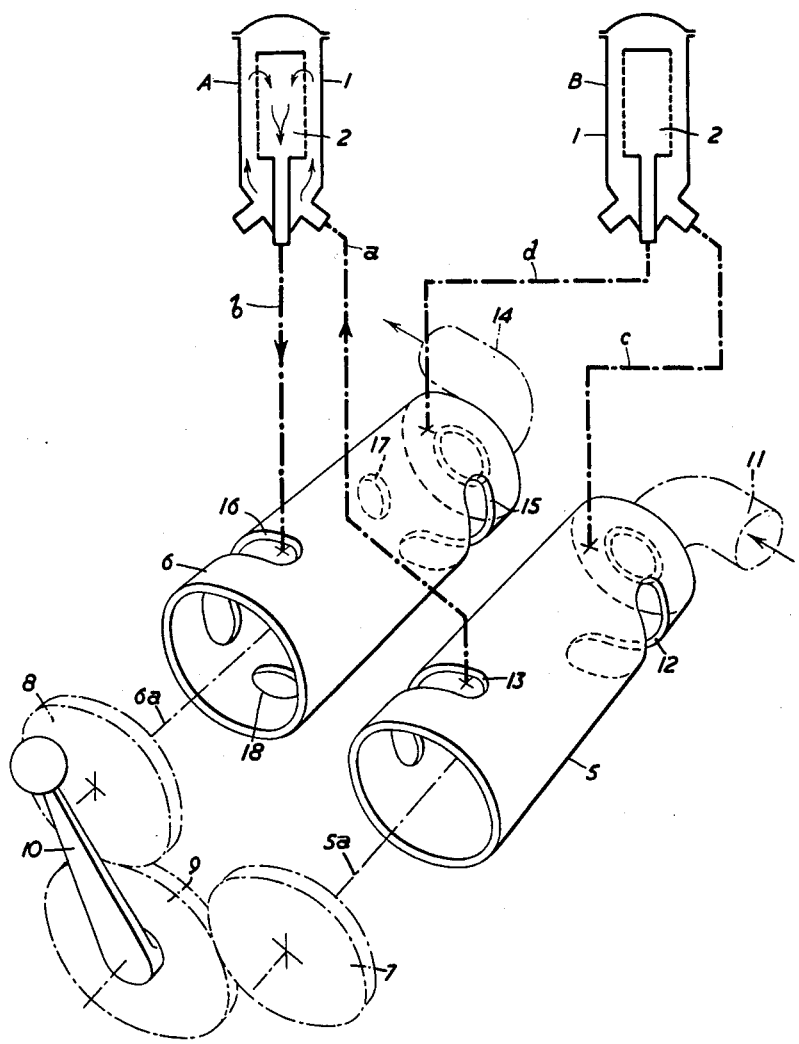
FIGURE 3 is an isometric schematic view illustrating the valve means for controlling the flow to the filter units of the plant shown in FIG. 2, the valve means being shown in a position such that the filter unit A is connected in service and the unit B is withdrawn from service.

The arrangement of the valve means and conduits is best seen in FIGURE 3 and as illustrated a pair of rotary plug valves 5, 6 is provided mounted respectively on shafts 5a, 6a which are connected to gears 7, 8 in mesh with a control gear 9 provided with a manually operable lever 10.

The rotary plug 5 is connected with a conduit 11 for liquid to be filtered and the wall of the plug is formed with an elongated port 12, 13 at each end, the ports being set at 180° from one another.

The rotary plug 6 is connected with a conduit 14 for delivering filtered liquid to a clean liquid tank or to a point of use, and the wall of the plug 6 is formed with an elongated port 15, 16 at each end similar to the ports 12, 13 of valve 5. The valve 6 also has two axially spaced circular ports 17, 18.

As shown in FIGURE 3 the valves 5, 6 are in the position such that the unit A is in service and the unit B is withdrawn from service and it will be noted that the port 13 of the valve 5 is in register with a flow line $a$ leading to the inlet side of the unit A, and the port 16 of valve 6 is in register with a flow line $b$, connected with the discharge side of the unit A. The flow lines $c$, $d$ connected with inlet and discharged sides of the unit B are however out of register with the port 12, 15 of the valve 5 and 6.

Accordingly with the valves in the position indicated in FIGURE 3, liquid flows from inlet 11 through valve 5 flow line $a$ to the unit A and after flowing through the filter flows along flow line $b$ through valve 6 to the discharge conduit 14 to a clean liquid tank or point of use. In the case where the liquid is lubricating oil, the clean oil would be discharged to a clean oil tank or into the lubricating system to be delivered to machinery to be lubricated.

It will be noted that the flow lines $c$, $d$ connecting the inlet and outlets of the filter unit B with the valves 5, 6 are not in register with the ports 12, 15 of those valves and therefore there will be no flow of liquid through the unit B.

Figure 5:
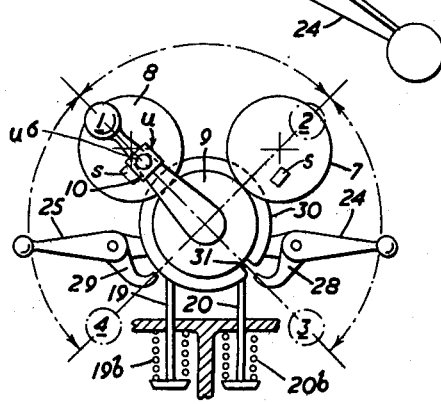
FIGURE 5 is a schmatic view illustrating the various positions of the valve control lever shown in FIG. 4.

To effect a change-over to bring unit B into service and withdraw unit A, the operating lever 10 is rotated in a clockwise direction through an angle of 90° from position (1) to the position (2) FIGURE 5. This rotation is transmitted through the gears 9, 7 and 8 to rotate the valves 5, 6 into the position indicated in FIGURE 6 wherein the ports 13, 16 are out of register with the flow lines $a$, $b$ of unit A and the ports 12, 15 are in register with the flow lines $c$, $d$ of unit B.

If it is desired to clean the filter element of the unit not in service the lever is given a further movement to reopen the appropriate valve and a drain valve is opened to permit a reflux flow of filtered liquid to the discharge side of the filter such that the liquid flows outwardly through the filter element to dislodge foreign matter and carry it away through the open drain valve to a contaminated liquid tank.

Figure 4:
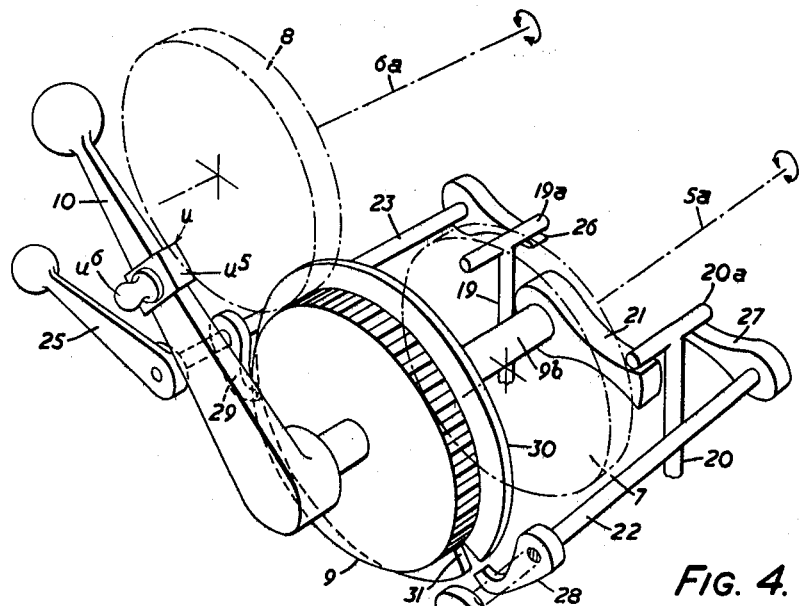
FIGURE 4 is an isometric schematic view illustrating means for operating the valves according to the embodiment shown in FIGS. 1 to 3.

To effect a reflux cleaning operation it is necessary to open a drain valve connected with the unit to be cleaned and as shown in FIGURES 4 and 5 a drain valve 19 is provided for the unit A and a drain valve 20 for unit B. The valve stems are provided with cross-bars 19a, 20a adapted to be engaged by an operating arm 21 on a shaft 9b carried by the gear 9.

As shown in FIGURE 4 the arm 21 is disposed under the crossbar 20a of the drain valve 20 and accordingly if the lever is further rotated in an anticlockwise direction to the position (4) FIGURE 5 the arm 21 will be given an anticlockwise rotational movement through an angle of 90° to lift the stem of the valve 20 to open it. Detent means is provided to limit the normal rotation of the lever 10 to the 90° required to effect a change over of the filter units that is to say from position (1) to position (2) and vice versa, the detent being adapted to be manually released to permit the further rotation of the lever to positions (3) or (4) when it is desired to reflux clean the unit not in service.

As shown in FIGURES 4, 5 and 5a the releasable detent comprises a U-shaped member $u$ mounted on the lever 10 and having a stud $u^1$ extending through a hole in the lever into a recess $u^2$. The stud has an end plate $u^3$ and a coil spring $u^4$ surrounds the stud in interposed relation between the bottom of the recess and the end plate so as normally to urge the end plate $u^3$ outwardly of the recess and thus draw the detent $u$ against the adjacent face of the lever in which position the outer edges of the side walls $u^5$ of the detent extend beyond the inner face of the lever 10 as shown in FIGURE 5a. A knob $u^6$ is attached to the detent to enable it to pulled outwardly against the action of the spring $u^4$ into a position wherein the outer edges of the side walls $u^5$ no longer extend beyond the inner face of the lever 10.

Abutments $s$ are provided on a suitable support adjacent the position the lever 10 takes up when in its No. 1 and No. 2 positions respectively (FIGURE 5). The detent is normally urged outwardly by the spring $u^4$ and accordingly when the lever 10 is moved into either of its changeover positions 1 or 2, the projecting edge of the side walls $u^5$ strikes the abutment $s$ and stops further rotation. If it is desired to reflux clean the filter not in service, the detent is released by manually pulling on the knob $u^6$ to withdraw the side walls out of the path of the abutment thereby permitting the lever to be further rotated in its position 3 or 4 as the case may be.

Figure 6:
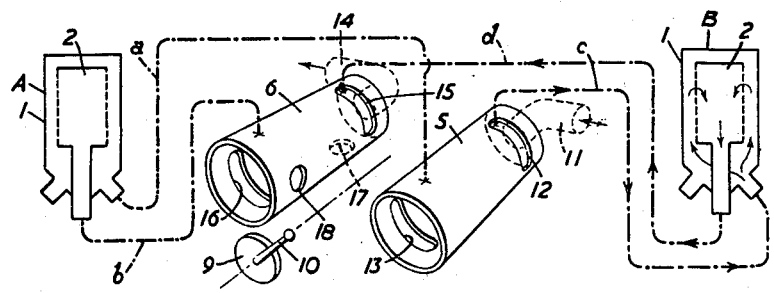
FIGURE 6 is a schematic view illustrating the position of the valve means and the flow of liquid when the filter unit B is in service and unit A withdrawn from service.
Figure 6B:
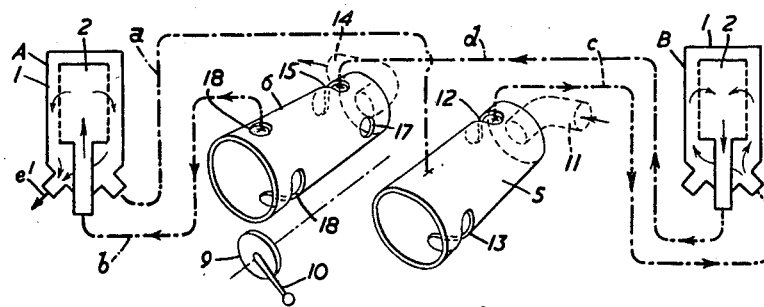
FIGURE 6b is a schematic view similar to FIG. 6 but showing the valve means further moved to a position to permit a reflux flow of liquid through the unit A, which is not in service, to clean it.
Figure 6A:
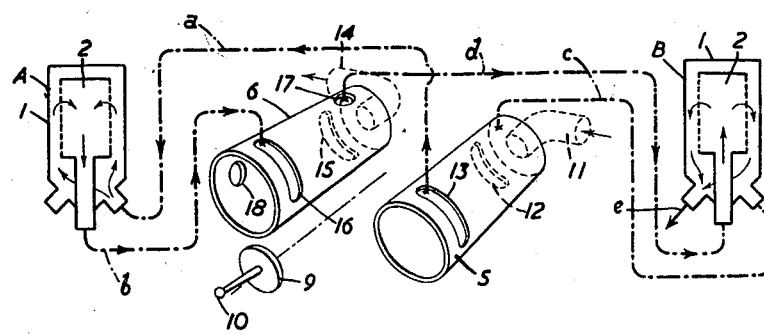
FIGURE 6a is a schematic view similar to FIG. 3 but showing the valve means further moved to a position to permit a reflux flow of liquid through the unit B which is not in service, to clean it.

The reflux flow of liquid will be more clearly understood by reference to FIGS. 6a, 6b. As shown in FIG. 6a the unit A is in service and unit B withdrawn and the lever 10 has been further rotated from position (1) to position (4) FIG. 5, such that the valves 5, 6 have been further rotated in a clockwise direction through an angle of 90° so that port 17 is now in register with the flow line $d$ leading to the outlet side of the unit B and the drain valve 20 of unit B is open. By virtue of their elongated shape the ports 13, 16 are still in register with the flow lines $a$, $b$ respectively of unit A and accordingly that unit remains in service but a portion of the filtered liquid flowing to the valve 6 from unit A is permitted to flow through port 17 and line $d$ to the unit B where it flows in reflux outwardly through the filter element of the unit to clean it and is discharged with entrainer foreign matter dislodged from the filter, to the flow line $e$ through the drain valve 20 (FIG. 5) and into a contaminated liquid tank.

The reflux flow will continue so long as the lever 10 is held in the position (4) which may be for a matter of seconds. When released, the lever 10 will be returned, for example by a spring, to the position (1) whereupon the valves 5, 6 will be rotated back to the position indicated in FIG. 3 wherein the port 17 is out of register with the flow line $d$ thereby shutting off the reflux flow, further the arm 21 (FIG. 4) will be reversely rotated to allow the drain valve 20 to be closed by it sspring 20b.

When the lever 10 is moved to position (2) to bring the unit B into service and withdraw unit A, valves 5 and 6 will be rotated into the position indicated in FIG. 6 so that the flow line $c$ is in register with the port 12 of valve 5 and flow line $d$ is in register with the port 15 of valve 6. The flow lines $a$, $b$ from unit A are now however out of register with ports 13, 16.

Liquid to be filtered will now flow from conduit 11 through the port 12 of the valve 5 into the flow line $c$ to the inlet of the filter unit B. Filtered liquid leaves the unit B and is discharged into flow line $d$ from whence it flows through the port 15 of valve 6 to the outlet conduit 14. If it is desired to clean the filter element of unit A, the detent u is released and the lever 10 is given a further clockwise rotation through an angle of 90° into position (3) FIG. 5 to rotate the valves 5, 6 in an anticlockwise direction into the position indicated in FIG. 6b so that port 18 is in register with flow line b while flow lines c, d are still in register with ports 12, 15. When the lever 10 is in position (2), the arm 21 will have been rotated to lie under the cross bar 19a of drain valve 19. On the further rotation of the lever 10 to position (3) the arm 21 is rotated to lift the cross bar 19a and open the drain valve 19.

A portion of the clean filtered liquid flowing into the valve 6 from the flow line d is now permitted to flow through port 18 and flow line b to the outlet side of the unit A and after passing outwardly through the filter element to clean it, it is discharged into the flow line $e^1$ through the drain valve 19 (FIG. 5) into a contaminated liquid tank.

The lever 10 is normally only held in position (3) for a short period and when released it is returned for example by a spring to position (2) where the port 18 will be out of register with the flow line b so that the reflux to filter unit A is shut off and the drain valve 19 closed by its spring 19b.

To enable the filters to be drained of liquid when necessary means is provided for independently opening the drain valves. As shown in FIGURES 4 and 5 a pair of rotatably mounted rods 22, 23 is provided having operating levers 24, 25. An arm 26, 27 is mounted on the respective rods adjacent the drain valve stems such that downward movement of lever 24 or 25 will effect the rotation of the respective arm 26, 27 to open the associated drain valve.

It is important to prevent the inadvertent draining of a filter unit which is in service and accordingly the rods 22, 23 are provided with pawls 28, 29 adapted to cooperate with a disc 30 mounted on the shaft 9b and provided with a recess 31. The recess 31 is so located that when the lever 10 is in position (1) (FIGURE 5) the pawl 29 is adjacent an unrecessed portion of the disc 30 and accordingly the lever 25 which controls the opening of the drain valve associated with the unit A which is in service, cannot be operated. The pawl 28, however, is in register with the recess 31 and thus the lever 24 can be moved downwardly to open the drain valve associated with the unit B which is out of service.

Similarly when the lever 10 is in position (2) only the lever 25 can be operated to open the drain valve associated with the unit A which would be out of service.

Figure 2:
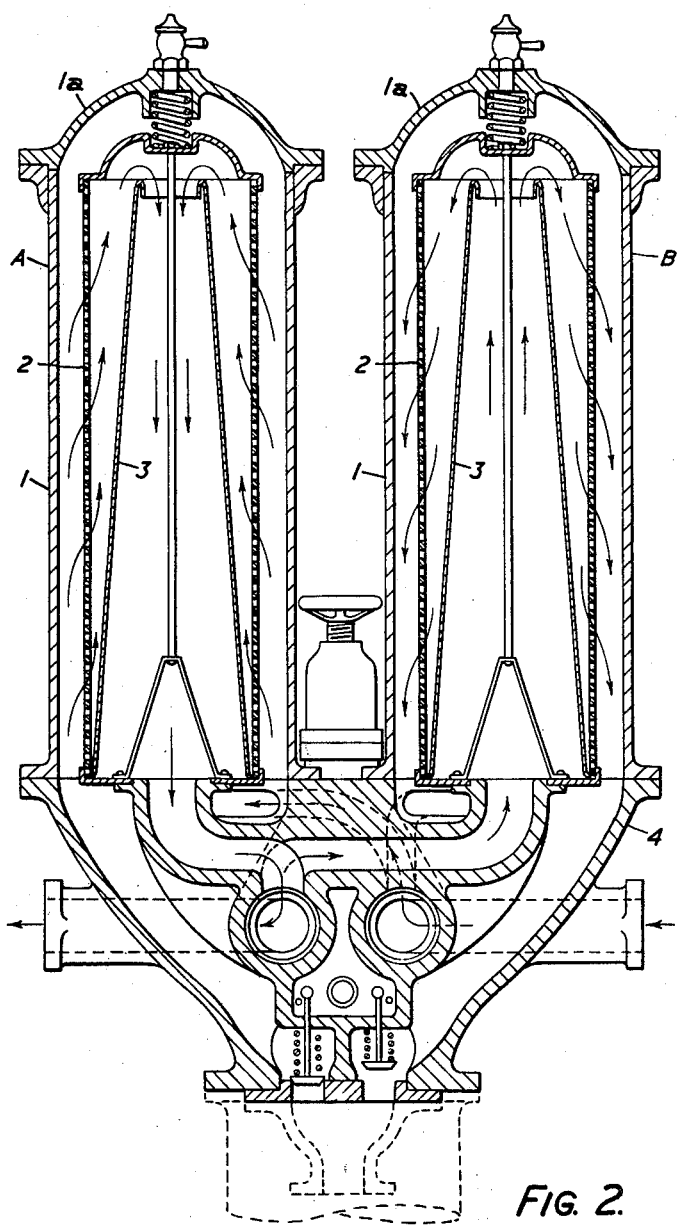
FIGURE 2 is a sectional view thereof.

It will be noted that due to the provision of the member 3, FIG. 2, the filter liquid after passing inwardly through the filter element is constrained to flow upwardly into the top of the member 3 thereby ensuring that free air or vapour is not permitted to collect in the upper portion of the casing 2 from which it would require to be removed either by periodic venting or a continuous bleed through an open vent in order to prevent displacement of the liquid in the unit and reduction in the effective area of the filter element. The provision of this member 3 thus permits a filter unit configuration in which the filter casings can be disposed above the liquid inlet, outlet reflux and drain conduits, thereby providing maximum accessibility to filter elements, convenient grouping of the control means and elimination of the need for periodic or continuous venting.

Figure 7:
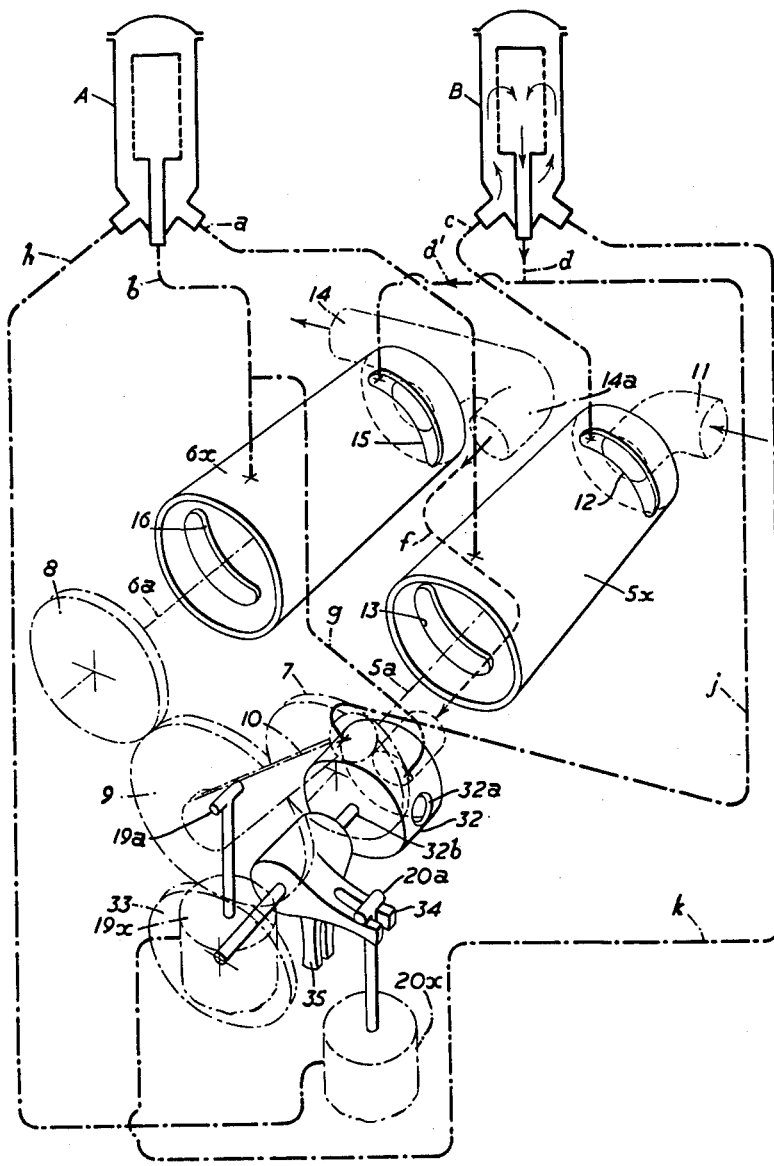
FIGURE 7 is an isometric schematic view illustrating a modification of the invention wherein a separate reflux valve, operated by the valve control lever, is provided.

According to the modification of the invention as shown in FIG. 7, instead of the continued rotation of the lever 10 effecting the re-opening of the valves 5, 6 to provide a reflux cleaning, a separate reflux valve is provided.

As shown in FIG. 7, a pair of rotary plug valves 5, 6 is provided mounted respectively on shafts 5a, 6a which are connected to gears 7, 8 in mesh with a control gear 9 provided with a manually operable lever 10.

A further rotary plug valve 32 having a port 32a, is provided mounted on a shaft 32b, carrying a gear 33, also in mesh with the control gear 9. The shaft 32b carries lever 34, 35 each having a bifurcated end. Drain valves 19, 20 are provided, each valve having an operating stem provided with a cross-bar 19a, 20a. The valves are normally closed by springs and are adapted to be opened by the levers 34, 35 engaging the respective crossbars to lift the valve stems on rotation of the shaft 32b.

The rotary plug 5 is connected with the inlet conduit 11 for liquid to be filtered and the wall of the plug is formed with elongated ports 12, 13 as in the embodiment according to FIG. 3.

The rotary plug 6 is connected with the outlet conduit 14 which includes a branch 14a connected by flow line with the rotary reflux valve 32. The wall of the plug 6 is formed with elongated ports 15, 16 as in FIG. 3 but no ports such as 17 and 18 are provided.

As shown in FIGURE 7 the valves 5, 6 are in the position such that the unit B is in service and the unit A is withdrawn from service and it will be noted that liquid from the inlet 11 enters valve 5 and flows through the port 12 along the flow line c into the inlet side of the unit B. After passing through the filter element 2 the filtered liquid is discharged from the unit to flow line d, which is connected by a branch $d^1$ leading to the valve 6, and accordingly the filtered liquid will flow through the port 15 into the outlet conduit 14 to the point of use of clean liquid.

It will be noted that the flow lines a, b connecting the inlet and outlets of the filter unit A with the valves 5, 6 are not in register with the ports 13, 16 of those valves and therefore there will be no flow of liquid through the unit A. As the port 32a of the reflux valve 32 is out of register with the flow line f there will be no flow of liquid through the valve 32.

If it is desired to clean the filter element 2 of the unit A which is not in service, the lever 10 is given a further rotational movement in a clockwise direction through an angle of approximately 90°. This movement is transmitted through gears 9 and 33 to the shaft 32b so that the valve 32 is rotated to position the port 32a in register with the flow line g and the arm 34 is rotated to open the drain valve 20. The valves 5, 6 will also be given a small rotational movement but the elongated form of the ports 12, 15 ensures that they will remain in register with the flow line c and $d^1$.

As the flow line g is now in register with the port 32a of the reflux valve 32, a portion of the filtered liquid can now flow through the branch 14a through the flow line f to the valve 32 and through flow lines g, b to the outlet side of the filter unit A into the interior of the element 3 and outwardly therethrough. The reflux flow of liquid will dislodge any foreign matter clogging the element and thereby clean it ready for when the unit is to be brought back into service.

The reflux liquid and any foreign matter dislodged from the filter element flows through the flow line h and the drain valve 20 which is open to a contaminated liquid tank.

The reflux flow will continue so long as the lever 10 is held in its position of further rotation which may be for a matter of seconds. When released, the lever 10 will be returned, for example by a spring, to the position shown in FIGURE 7 and the valve 32 returned to move the port 32a out of register with the flow line g thereby shutting off the reflux flow. Further the arm 34 will no longer lift the cross bar 20a and the drain valve 20 will be closed by its spring.

To change over the units to bring the unit A into service and withdraw unit B, the lever 10 is rotated in an anti-clockwise direction through an angle of 90° and through the intermediary of the gears 9, 7 and 8 the valves 5 and 6 are rotated to move ports 12, 15 out of register with the flow lines c, $d^1$ and bring the ports 13, 16 into register with flow lines a, b respectively.

Liquid to be filtered will now flow from the inlet conduit 11 through the port 13 of valve 5 into the flow line $a$ to the inlet of the filter unit A. Filtered liquid leaves the unit A and is discharged into flow line $b$ from whence it flows through the port 16 of valve 6 to the outlet conduit 14. Flow lines $c$, $d^1$ not now being in register with the ports 12, 15 there will be no flow through the unit B. The shaft 32$b$ will now have been rotated so that the arm 35 lies adjacent the cross-bar 19$a$ of the valve stem of the drain valve 19. If it is desired to clean the filter element of unit B, the lever is given a further anti-clockwise rotation through an angle of 90° to rotate the reflux valve 32 to bring its port 32$a$ in register with the flow line $j$, the further rotation of the shaft 32$b$ also serving to rotate the arm 35 to lift the cross-bar 19$a$ to open the drain valve 19.

A reflux flow of filtered liquid is now permitted from the branch 14$a$ flow line $j$ valve 32 and flow lines $j$, $d$ to the outlet side of the unit B and after passing outwardly through the filter element to clean it, it is discharged into the flow line $k$ to the drain valve 19.

It may not be desired to effect a reflux cleaning of a filter unit every time the filter units are changed over and accordingly a manually controlled detent such as for example described with reference to FIGS 4, 5 and 5$a$ is provided to limit the rotation of the lever 10 to the movement necessary to effect the change over to bring one unit into service and withdraw the other. When a reflux cleaning operation is to be effected, the detent is withdrawn to free the lever for the further movement to open the reflux valve 32 and the appropriate drain valve.

Figure 8:
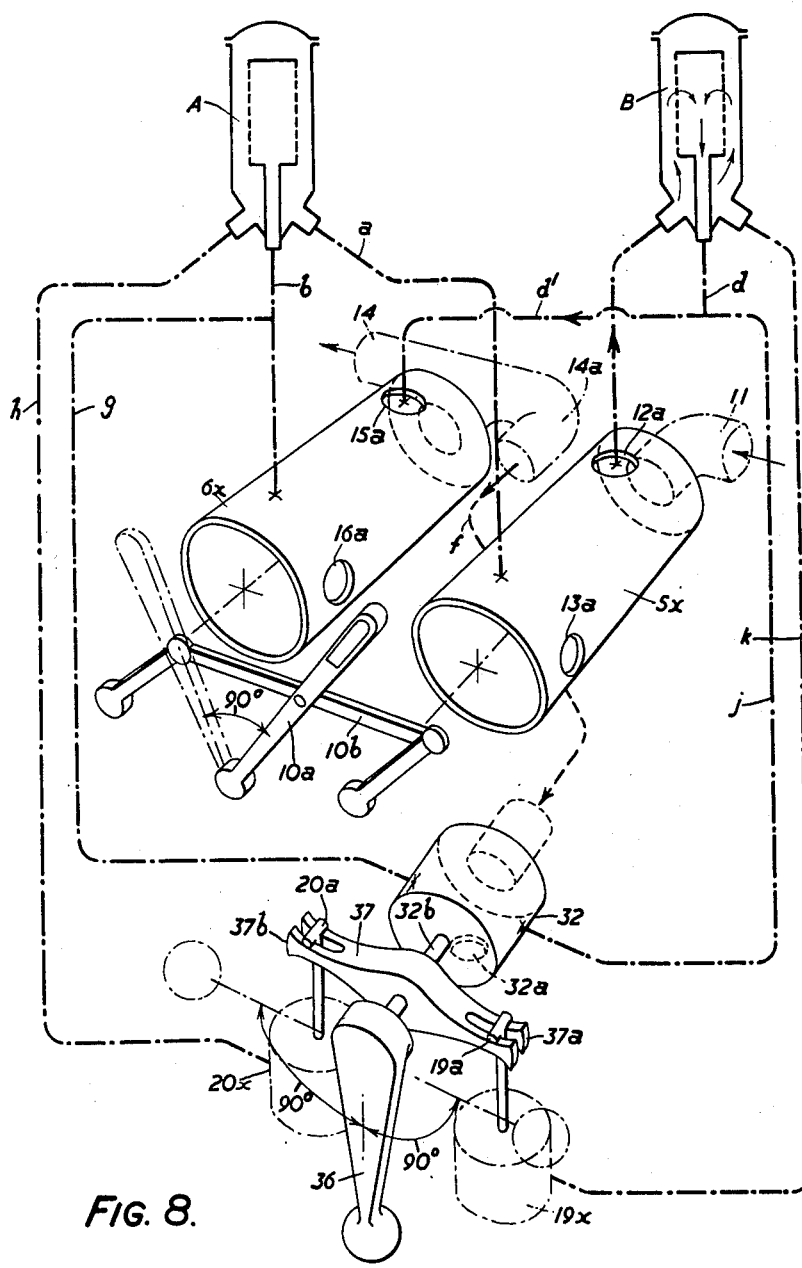
FIGURE 8 is an isometric schematic view illustrating another modification of the invention wherein two levers are provided, one for operating the flow control valves and one for operating the separate reflux and drain valves.

According to another embodiment as illustrated in FIGURE 8 a separate reflux valve is operated independently of the main operating lever of the valves 5, 6. Parts of like function to those of FIG. 7 are indicated by like reference letters and numerals. It will be noted however that in the embodiment of FIGURE 8 the ports 12$a$, 13$a$, 15$a$, 16$a$ in the valves 5, 6 are not elongated. The valves are rotated by an operating lever 10$a$ through the intermediary of link mechanism 10$b$. As shown in full lines the lever 10$a$ has been rotated to a position wherein the unit B is in service and unit A withdrawn. By rotating the lever through 90° to the position shown in broken lines the valves 5, 6 will be rotated to change over the units to bring A into service and withdraw B.

The reflux cleaning operation is controlled by a separate lever 36 mounted on a shaft 32$b$ carrying the reflux valve 32 and a double arm lever 37 including bifurcated arms 37$a$, 37$b$. When it is desired to reflux clean the filter A which is not in service, the lever 36 is rotated in a clockwise direction through 90° from the position shown in FIGURE 8 so as to rotate the reflux valve 32 to register its port 32$a$ with the flow line $g$ to permit reflux liquid to flow from the outlet branch 14$a$, through valve 32 and flow line $g$ to the discharge side of the unit A. When the valve 32 is rotated the drain valve 20 is simultaneously opened by the arm 37$b$ of the lever 37 lifting the crossbar 20$a$ so that the reflux liquid discharged from the unit A will flow through the drain valve 20 into a contaminated liquid tank.

Similarly when the units are changed over to withdraw unit B from service, the latter can be reflux cleaned by actuating the lever 36 to rotate the lever 37 in an anti-clockwise direction to rotate the valve 32 to register the port 32$a$ with the flow line $j$ to permit reflux liquid to flow from the branch 14$a$, valve 32, flow line $j$ to the discharge side of the unit B. The drain valve (19) being open the reflux liquid discharged from the unit B flows through flow line $k$ to the drain tank.

In FIGURE 8$a$ there is illustrated in diagrammatic form an interlock between the lever 10$a$ and 36 to ensure that the lever 36 can only be rotated to initiate a reflux flow through the filter unit which is out of service.

As shown the pivot end of the lever 10$a$ or the shaft on which it is mounted carries a double nose cam including symmetrical nose portions $n^1$, $n^2$ projecting from opposite sides. The shaft 32$b$ of the lever 36 has a member $n^3$ formed in a recess $n^4$ shaped to an arc of a circle. As shown in FIGURE 8$a$ the lever 10$a$ has been rotated into a position such that filter unit B is in service and unit A is out of service and in this position the nose $n^1$ abuts or is in closely spaced relation to the adjacent end portion of the recess $n^4$ and prevents the lever 36 being rotated in an anti-clockwise direction to initiate a reflux flow through the filter unit B which is in service. The lever 36 can however be rotated in a clockwise direction to initiate a reflux flow through the unit A which is out of service. Similarly when the lever 10$a$ is rotated to bring unit A into service and withdraw unit B out of service, the nose $n^2$ will be disposed adjacent the opposite end of the recess $n^4$ and in this case the lever 36 can only be rotated in an anti-clockwise direction to initiate a reflux flow through the unit B which is out of service.

Figure 9:
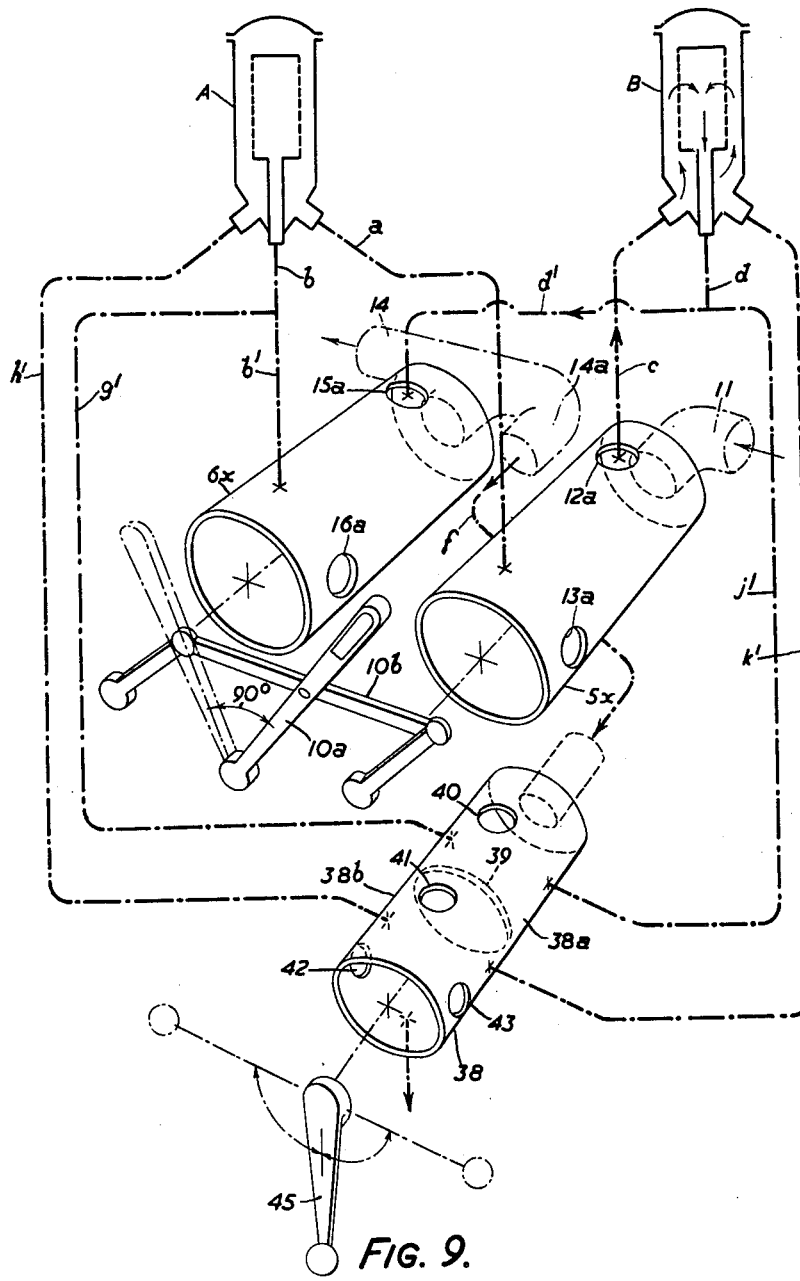
FIGURE 9 is a schematic view illustrating a further modification of the invention wherein two levers are provided, one for operating the flow control valves and one for operating a combined reflux and drain valve.

The further embodiment illustrated in FIGURE 9 differs from that illustrated in FIGURE 8 in that a combined reflux and drain valve unit is provided. As shown this comprises a rotary valve plug 38 divided into separate valve compartments 38$a$, 38$b$ by a partition 39. The wall of the compartment 38$a$ has a port 40 and that of compartment 38$b$ has ports 41, 42 and 43, the last two mentioned ports controlling the flow to drain tanks. The valve 38 is mounted on a shaft 44 adapted to be rotated by an operating lever 45 and if it is desired to reflux clean the filter unit A which is not in service, the lever 45 is rotated in an anti-clockwise direction through an angle of 90° so that the ports 40, 41 register with flow lines $g^1$, and $h^1$ respectively and port 42 registers with a flow line leading either directly or indirectly to the contaminated liquid tank. Accordingly reflux liquid can flow from the outlet branch 14$a$ through flow line $f$, port 40 and flow line $g^1$ to reflux clean the unit A, the liquid being discharged through flow line $h^1$ and ports 41, 42 to the drain tank.

Similarly when the units are changed over to withdraw unit B, the latter can be reflux cleaned by rotating the lever 45 in a clockwise direction through an angle of 90° when ports 40, 41, will register with flow lines $j^1$, $k^1$ respectively and port 43 will register with a flow line leading to a drain tank.

An interlock is provided for the levers 10$a$ and 45 and as shown diagrammatically in FIGURE 9$a$ this includes a nose $m$ on the lever 10$a$ or on the shaft on which the lever is mounted, and a member $m^1$ on the shaft 44 having a recess $m^4$ shaped to an arc of a circle. As shown in FIGURE 9$a$ the lever 10$a$ is in the position wherein unit B is in service and unit A out of service. It will be noted that the juxtaposition of the nose $m$ and end portion of the recess $m^2$ prevents the rotation of the lever 45 in a clockwise direction but permits it to be rotated in an anti-clockwise direction to initiate a reflux flow through the unit A which is out of service. Similarly when the lever 10$a$ is rotated to effect a change over of the filter units, the nose $m$ will be juxtaposed to the opposite end of the recess $m^2$ so that the lever 45 can only be rotated in a clockwise direction to initiate a reflux flow through the unit B which will be out of service.

The lever 45 may be connected with the shaft 44 of the valve 38 through the intermediary of a spring loaded trip which may be cam controlled, the arrangement being such that when the lever 45 is moved into either of its reflux positions, the trip is actuated to disengage the lever from the shaft permitting the latter and the valve 38 to be automatically returned by spring means to the position shown in FIGURE 9 to shut off the flow of reflux fluid.

Figure 10:
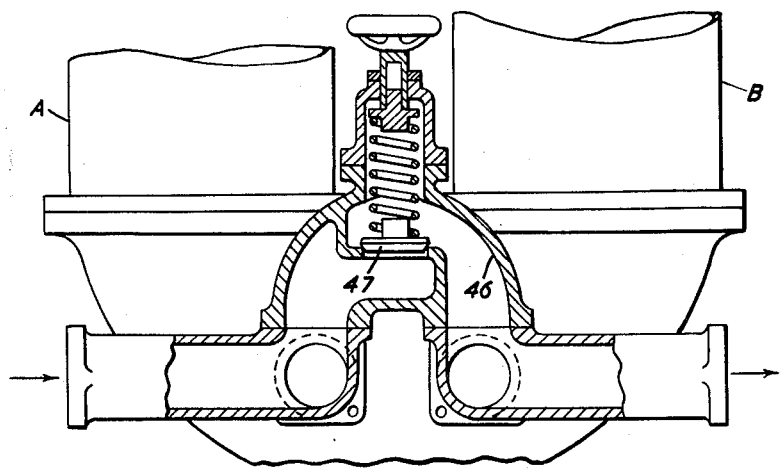
FIGURE 10 is a part sectional view illustrating the adjustable by-pass between the inlets of the filter units.

A full flow valve controlled by-pass may be provided between the inlets and outlets of the units according to any of the embodiments described above and adapted to be opened if differential pressure exceeds a predetermined maximum. As shown in FIGURE 10 the by-pass 46 is normally closed by a spring loaded valve 47 the loading of which may be fixed or adjustable.

The reflux liquid after being discharged from the unit being cleaned may be delivered directly into a contaminated liquid tank to be subsequently cleaned, for example by treatment in a centrifugal separator, and thereafter returned to the system.

Figure 11:
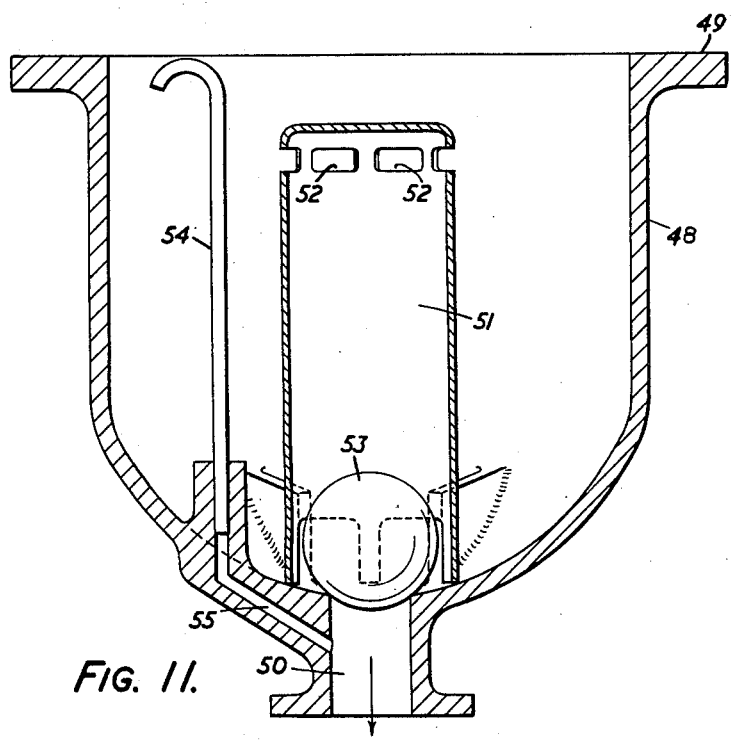
FIGURE 11 is a sectional view of a drain tank for receiving the reflux liquid after it has passed through and cleaned a filter unit.
Figure 12:
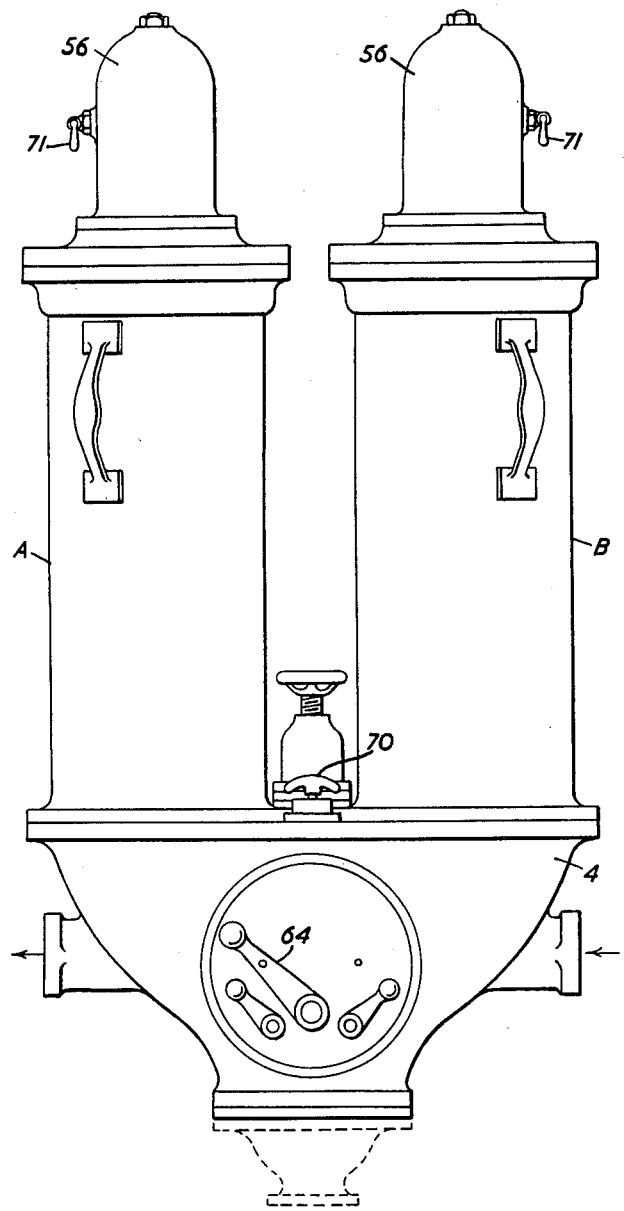
FIGURE 12 is an elevational view of a still further modification of the invention.

Alternatively the reflux liquid may be discharged into the contaminated liquid tank by way of a self-draining tank (FIG. 11) having means whereby the duration of the reflux cleaning operation is automatically controlled. One suitable tank is shown in FIGURE 11 and comprises a chamber 48 having a flange 49 to enable it to be secured to the base of the body 4 (FIGURE 2) as indicated in broken lines. The chamber has an outlet 50 in its base connected to a contaminated liquid tank and a cylindrical casing 51 extending upwardly of the chamber, its lower open end being attached to the base of the chamber so as to surround the inner end of the outlet 50. The top of the casing is closed and a series of ports 52 is formed in its wall adjacent the closed end. A buoyant ball valve 53 is located in the casing and normally sets on and closes the inner end of the outlet 50. An air vent pipe 54 extends upwardly of the base of the chamber its lower end communicating by means of a passage 55 with the outlet 50 below the ball valve and its upper end opening adjacent the upper end of the chamber above the upper end of the casing 51.

When a reflux cleaning of a filter unit is effected the reflux liquid will be discharged from the unit into the chamber 48. The rapid entry of the liquid into the chamber will instantly fill the tank except for some air which will be trapped in the upper end and the pressure produced in the tank will be such that the ball valve 53 will be kept on its seat closing the outlet 50. The air trapped in the upper end of the tank will vent through the pipe 54 to the outlet 50 and thereafter the flow of reflux liquid into the tank will be restricted to a small negligible amount as permitted by the small bore flow pipe 54, until the reflux valve is closed by the return movement of the control lever.

When due to the closing of the reflux valve and the venting of the air, the pressure in the chamber and in the outlet 50 become equalized, the ball valve 53 will float upwardly within its casing 51 and the liquid in the tank will then be permitted to drain through the outlet, the ball subsequently resetting on the inner end of the outlet ready for the next reflux cleaning operation.

FIGS. 12 to 17 illustrate a still further modification wherein a hydro-pneumatic accumulator is provided at the upper end of each unit for effecting the reflux cleaning operation.

As shown, the duplex filter plant is similar to that illustrated in FIGS. 1 and 2 but a dome shaped chamber 56 is mounted on the top of each unit and houses a flexible bag 57 made of rubber or other suitable material which is filled with air at atmospheric or other prescribed pressure. If desired the securing means for the bag may include valve means for adjusting the pressure of air in the bag. The chambers 56 are in communication with the interiors of the respective filter units by means of the opening 58 so that the bag is subjected to the pressure prevailing in the respective filter unit.

Figure 13:
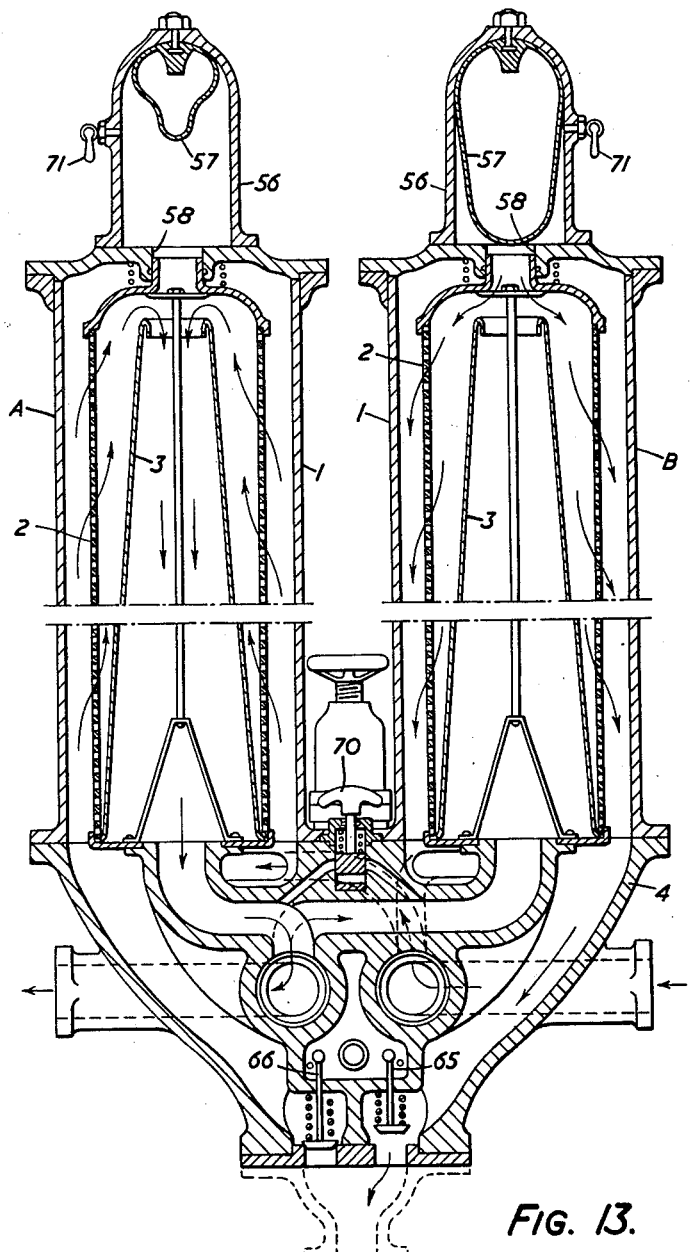
FIGURE 13 is a sectional view of the modification of the invention according to FIGURE 12.

As illustrated in FIG. 13, the unit A is in service and the pressure in the unit and chamber is such that the bag 57, is compressed as shown, the compressed air in the bag thereby providing a source of stored energy.

When the units are changed over to withdraw unit A from service, as both the inlet and outlet of the unit will be closed, the liquid in the unit A will still be that of the operational pressure of the system and the bag 57 will remain compressed. If it is desired to reflux clean the unit A a drain valve is opened which instantly releases the pressure in the unit and the bag is expanded by the air compressed therein so as to effect a rapid expulsion of the liquid from the chamber 56, through the opening 58 so as to set up a surge of reflux liquid outwardly through the filter element to clean it.

In FIG. 13 the unit B is shown in the process of being reflux cleaned.

Figure 14:
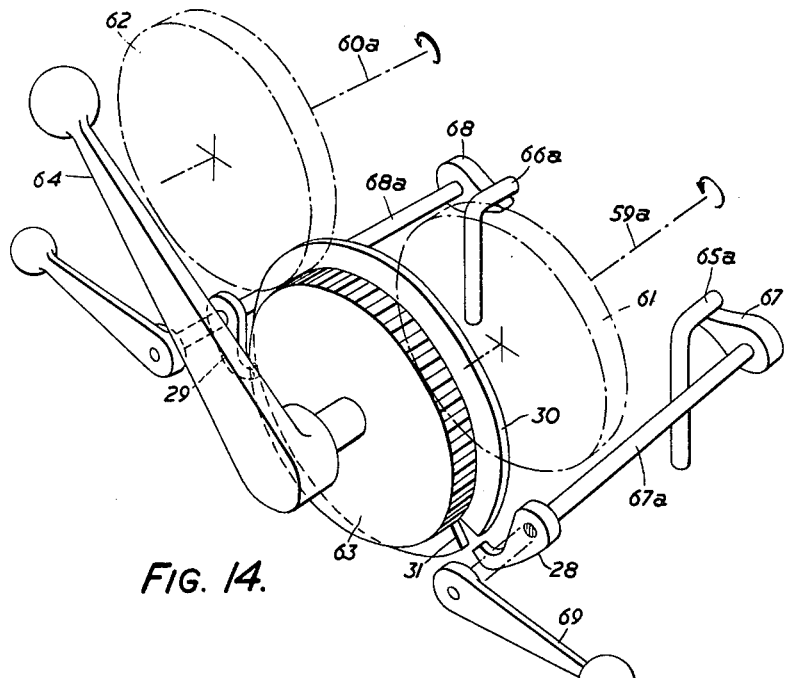
FIGURE 14 is a schematic view showing the means for operating the valves.
Figure 15:
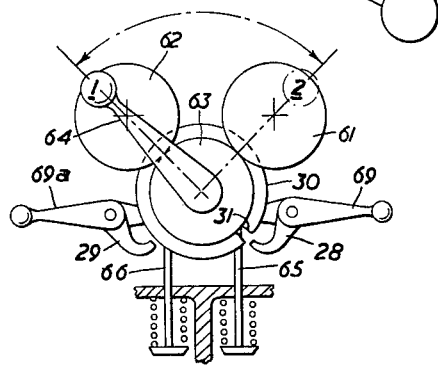
FIGURE 15 is a schematic view illustrating different positions of the control lever.
Figure 16:
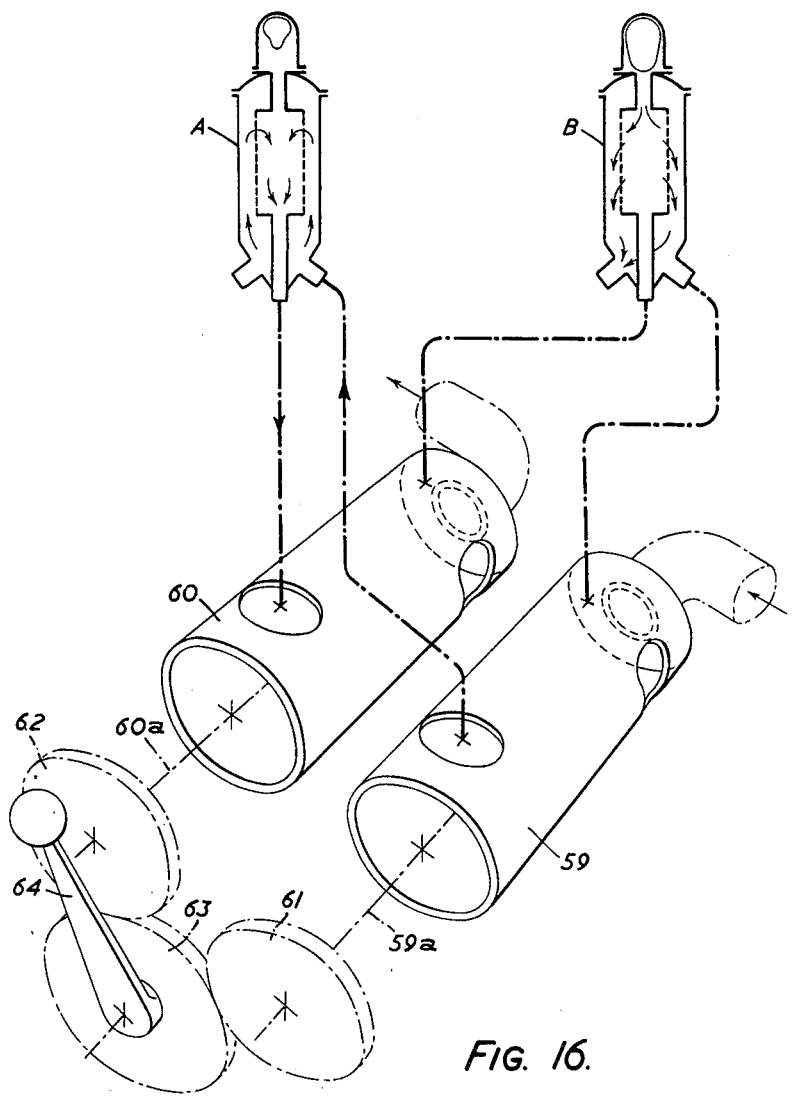

As shown in FIGS. 14 to 16 the flow of liquid to the units is controlled by rotary plugs 59, 60 mounted on shafts 59a, 60a carrying gears 61, 62 with a gear 63 which is adapted to be rotated by the control lever 64 which is rotatable through 90° between the position shown in FIG. 16 where the unit A is in service, and the position shown in FIG. 17 where the unit B is in service.

Drain valves 65, 66 are provided for the units B, A respectively and include valve stems having cranked ends 65a, 66a engageable by arms 67, 68 on rods 67a, 68a provided with operating handles 69, 69a.

To ensure that only the drain valve of the unit not in service can be opened, an interlocking arrangement is provided and it will be noted that where, as indicated in FIGS. 14, 15 the unit A is in service, the pawl 29 on the drain valve lever 69a is opposite an unrecessed part of the disc 30 and the drain valve lever 69a cannot therefore be operated. The pawl 28 of the drain valve lever 69, is however aligned with the recess 31 so the lever can be rotated in a clockwise direction to rotate the rod 67a to open the drain valve 65 of the unit B.

FIG. 16 illustrates the flow of liquid and the position of the valves when unit A is in service and unit B has been withdrawn and is in process of been reflux cleaned by a surge of liquid produced by the expansion of the bag 57, the flow of liquid and position of the valves when unit B is in service and unit A is withdrawn and in process of being reflux cleaned after opening drain valve 66 is indicated in FIG. 17.

The operating handles 69, 69a are only held depressed for a short period of time and when released are automatically returned to the inoperative position by spring means to permit the drain valve to be reclosed by its spring.

When a further change over is effected, the liquid to be filtered flowing into the unit of the filter unit which has been reflux cleaned, will again compress the bag 57 so that the compressed air therein will be available for the next reflux cleaning operation.

The chambers 56 must be dimensioned to contain sufficient liquid to produce a flow of liquid to effectively clean the filter element. The size of the casing will accordingly depend on the volume of liquid required to reflux clean the element, and the pressure normally available in the system to compress the air in the bag to the desired pressure.

If the filter element of a unit should be badly choked the pressure of the liquid downstream of the element may be so unduly reduced that a satisfactory reflux cleaning cannot be achieved. In such circumstances the pressure in the unit to be cleaned and in the chamber 56 can be raised by momentarily opening the spring loaded valve 70 in a by-pass connecting the liquid outlets of the filter units.

The provision of the valve 70 also enables the pressure to be restored in a unit after it has been reflux cleaned thereby enabling two or more successive reflux cleaning operations to be carried out if desired.

By providing that the size of the chamber 57 is such that there will be a sufficient volume of liquid to clean the filter, the volume of liquid discharged from the system for each cleaning operation is predetermined.

As an alternative to providing an inflatable bag in each filter unit, a single bag may be provided in a compartment above and adjacent to the units, self-sealing coupling means being provided to enatble the compartment containing the inflatable bag to be placed in communication with the casing of the filter unit to be cleaned and isolated from that which happens to be in service.

Further, instead of the bag or bags being sealed and the air therein adapted to be compressed by the pressure obtaining in the filter system, the bag or bags may be connected to a source of compressed fluid and adapted to be inflated when it is desired to effect a reflux flow through a filter unit.

According to a still further modification instead of providing a flexible bag or bags, air may be adapted to be trapped in a compartment at the upper end of the filter units and compressed by the pressure in the system on the downstream side of the filter elements, this compressed air being effective, on the opening of a drain valve, to force liquid in a unit out of service in reflux flow through the filter element of that unit.

An air valve 71 is provided for use when it is desired to completely drain the filter units.

As illustrated in FIGURE 18 the reflux liquid flowing from one or more duplex filters is delivered into a manifold 72 connected by a flexible pipe 73 with a removable cap 74 of a contaminated liquid tank 75. As shown a canister 76 having a fine mesh gauze 77 in its bottom is detachably mounted in the upper end of the tank 75 so that liquid from the pipe 73 flows through the gauze 77 to enter the tank.

By removing the canister and examining the amount of foreign matter deposited on the gauze 77, the extent of contamination of the filter unit which has been cleaned can be readily assessed. If necessary one or more further reflux cleaning operations can be carried out until an inspection of the gauze shows by absence of deposit that the filter element is clean or by inference, that all the contaminant which the filter element is capable of retaining has been removed from the liquid in circulation in the system. If examination of the reflux liquid is not required, it may be discharged directly into the tank 75 by removing the canister 76.

The contaminated liquid in the tank 75 may be discharged through the outlet 78 to waste or delivered to a purification plant including a centrifugal separator, the purified liquid being returned to the system.

I claim:

1. A duplex filter plant comprising a pair of filter units, a conduit connected with each unit for delivering liquid to be filtered, a second conduit connected with each unit for receiving liquid filtered by said unit, a rotary valve plug for controlling the flow of liquid through each said filter unit, a manually rotatable changeover device for rotating said valve plugs into one pre-determined position such that one of the units is connected in service to filter liquid and the other unit is withdrawn from service and isolated from said conduits and into a second pre-determined position such that the said other unit is brought into service to filter liquid and the first mentioned unit is withdrawn from service and isolated from said conduits, manually operable drain valve means connected with said units for reconnecting said conduits with the unit withdrawn from service so as to initiate a reflux flow of filtered liquid through the filter unit withdrawn from service and means operable positively to prevent the operation of said drain valve means except when the manually rotatable changeover device is in one of its said pre-determined positions.

2. A duplex filter plant comprising a pair of filter units, a conduit connected with each unit for delivering liquid to be filtered, a second conduit connected with each unit for receiving liquid filtered by said unit, changeover valve means for controlling the flow of liquid through the filter units, a manually rotatable changeover device for operating said valve means into one pre-determined position such that one of the units is connected in service to filter liquid and the other unit is withdrawn from service and isolated from said conduits and into a second pre-determined position such that the said other unit is brought into service to filter liquid and the first mentioned unit is withdrawn from service, further valve means for reconnecting said conduits with the unit withdrawn from service so as to initiate a reflux flow of filtered liquid through the filter unit withdrawn from service and isolated from said conduits, an additional manually rotatable device for operating said further valve means, means providing an interlock between said first mentioned and additional manually rotatable devices to prevent the rotation of said additional manually rotatable device except when said first mentioned device is in one of its said pre-determined positions.

3. A duplex filter plant comprising a pair of casings, a filter element located in each said casing, changeover valve means for controlling the flow of liquid through said casings and filter elements, a manually operable device for operating said valve means into one pre-determined position such that one of the filter elements is connected in service to filter liquid and the other filter element is withdrawn from service, and into a second pre-determined position such that the said other filter element is connected in service to filter liquid and the first mentioned filter element is withdrawn from service, a chamber communicating with each casing, compressible pneumatic energy storage means disposed in each chamber so as to be compressed to store up energy by the pressure prevailing in the casing of the filter element connected in service, a manually operable drain valve connected with each casing, a further manually operable device for operating said drain valves and means operable when the first mentioned manually operable device is in one of its said pre-determined positions, to permit the operation of said further manually operated device to open the drain valve of the casing of the filter element withdrawn from service, so as to relieve the pressure in said casing whereby the energy storage means in free to expand to effect a rapid reflux flow through said filter element.

4. A duplex filter plant comprising a pair of filter units, a conduit connected with each unit for delivering liquid to be filtered, a second conduit connected with each unit for receiving liquid filtered by said unit, changeover valve means for controlling the flow of liquid through the filter units, a manually operable changeover device for operating said valve means into one pre-determined position such that one of the units is connected in service to filter liquid and the other unit is withdrawn from service and isolated from said conduit and into a second pre-determined position such that the said other unit is brought into service to filter liquid and the first mentioned unit is withdrawn from service and isolated from said conduit, manually releasable stop means normally preventing movement of said device beyond said changeover positions, drain valve means connected with said filter units, means operatively connecting said manually operable device with said drain valve means, said device being operable on release of said stop means, to be moved beyond the changeover position to actuate said drain valve and further actuate said changeover valve means to initiate a reflux flow of filtered liquid through the filter unit withdrawn from service.

5. A duplex filter plant comprising a pair of filter units, a conduit connected with each unit for delivering liquid to be filtered, a second conduit connected with each unit for receiving liquid filtered by said unit, changeover valve means for controlling the flow of liquid through the filter units, a manually rotatable changeover device for operating said valve means into one pre-determined position such that one of the units is connected in service to filter liquid and the other unit is withdrawn from service and isolated from said conduits and into a second pre-determined position such that the said other unit is brought into service to filter liquid and the first mentioned unit is withdrawn from service and isolated from said conduits, manually releasable stop means normally preventing rotation of the said device beyond said changeover position, reflux valve means for initiating a reflux flow of filtered liquid through the filter unit withdrawn from service and means operative on the continued rotation of said device beyond said changeover positions on release of said stop means, to actuate said reflux valve means to initiate a reflux flow through the filter unit withdrawn from service.

6. A duplex filter plant comprising a pair of filter units, changeover valve means for controlling the flow of liquid through the filter units, a manually operable device for operating said valve means into one pre-determined position such that one of the units is connected in service to filter liquid and the other unit is withdrawn from service, and into a second pre-determined position such that the said other unit is brought into service to filter liquid and the first mentioned unit is withdrawn from service, a compressible gas filled envelope connected with said units so as to be compressed by the pressure in the unit which is connected in service, a manually operable drain valve connected with each filter unit, means operative to prevent the operation of said drain valves when the manually operable device is not in one of its said pre-determined positions, and when in one of said pre-determined positions to permit the drain valve of the unit withdrawn from service to be opened to effect a reduction in pressure in said unit, whereby said gas filled envelope is free to expand to effect a rapid reflux flow of filtered liquid through the filter unit withdrawn from service.

7. A duplex filter plant comprising a pair of filter units, a rotary valve plug for controlling the flow of liquid through each said filter unit, a manually rotatable device for rotating said valve plugs into one pre-determined position such that one of the units is connected in service to filter liquid and the other unit is withdrawn from service, and into a second pre-determined position such that the said other unit is brought into service to filter liquid and the first mentioned unit is withdrawn from service, manually operable drain valve means connected with said units for initiating a reflux flow of filtered liquid through the filter unit withdrawn from service, means operable positively to prevent the operation of said drain valve means except when the manually rotatable changeover device is in one of its said pre-determined positions, a drain tank connected with said drain valve means for receiving the reflux liquid, and means in said drain tank for automatically arresting the reflux flow when a predetermined volume of reflux liquid has entered said drain tank.

8. A duplex filter plant comprising a pair of filter units, changeover valve means for controlling the flow of liquid through the fiter units, a manually operable device for operating said valve means into one pre-determined position such that one of the units is connected in service to filter liquid and the other unit is withdrawn from service, and into a second pre-determined position such that the said other unit is brought into service to filter liquid and the first mentioned unit is withdrawn from service, further manually operable valve means for initiating a reflux flow of filtered liquid through the filter unit withdrawn from service, pneumatic energy storage means operable on the actuation of said further valve means, to release stored energy to provide the requisite pressure difference in the unit withdrawn from service to effect a rapid reflux flow of liquid therethrough, means operable positively to prevent the operation of said further valve means except when the manually operable changeover device is in one of its said pre-determined positions, and a drain tank connected with said units for receiving the reflux liquid after flowing through said unit; and means for automatically arresting said reflux flow when a pre-determined volume of reflux liquid has entered said drain tank.

References Cited in the file of this patent

UNITED STATES PATENTS

| | | |
|---|---|---|
| 1,264,296 | Hagan | Apr. 30, 1918 |
| 1,384,965 | Luckenbach | July 19, 1921 |
| 2,333,609 | Widman | Nov. 2, 1943 |
| 2,582,819 | Daily | Jan. 15, 1952 |
| 2,742,157 | Brunton | Apr. 17, 1956 |
| 2,805,774 | Griswold | Sept. 10, 1957 |

FOREIGN PATENTS

| | | |
|---|---|---|
| 699,915 | Germany | Dec. 11, 1940 |
| 729,356 | Great Britain | May 4, 1955 |
| 822,322 | Great Britain | Oct. 21, 1959 |